No. 705,083. Patented July 22, 1902.
F. W. HILD & S. B. STEWART, Jr.
ELECTRIC RAILWAY.
(Application filed Nov. 30, 1900.)
(No Model.) 4 Sheets—Sheet 1.
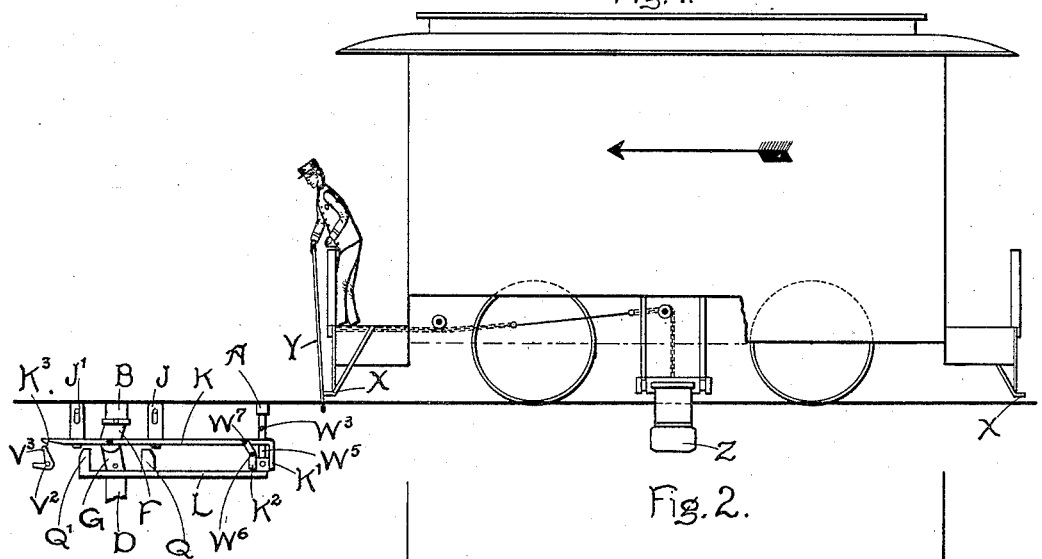
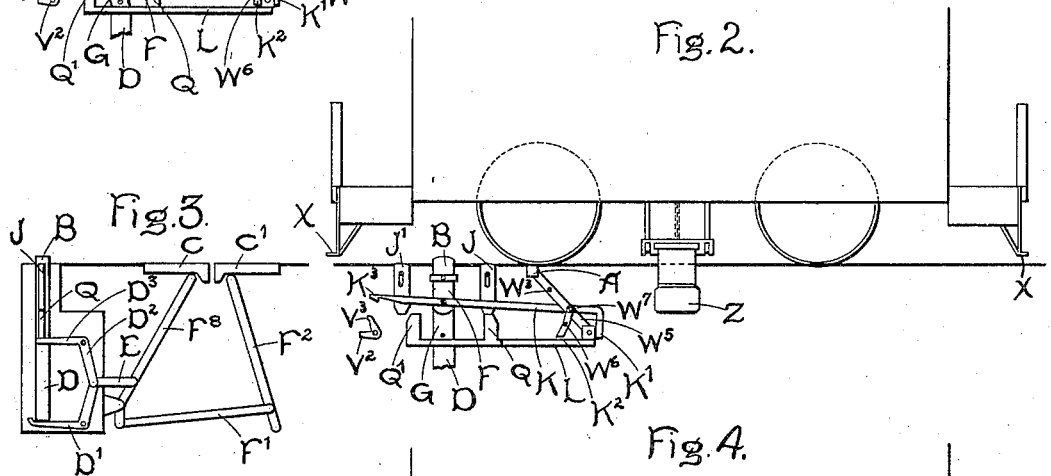
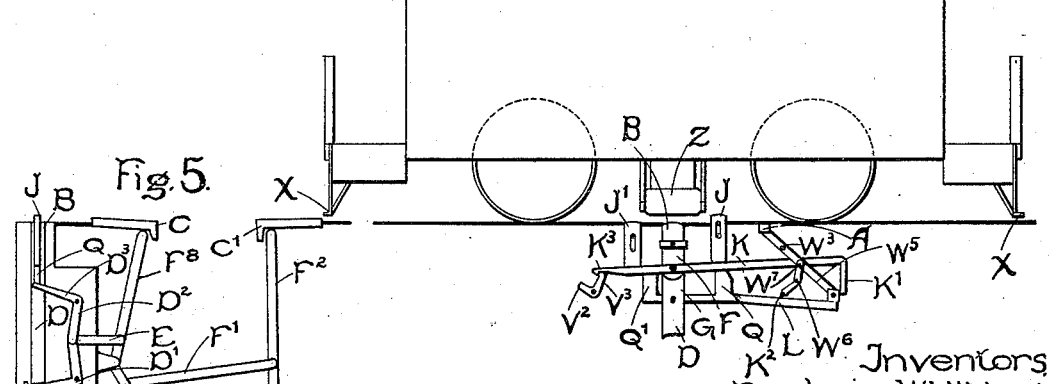
Witnesses
Inventors
Frederic W. Hild and
Samuel B. Stewart Jr.
by
Att'y.

No. 705,083. Patented July 22, 1902.
F. W. HILD & S. B. STEWART, Jr.
ELECTRIC RAILWAY.
(Application filed Nov. 30, 1900.)
(No Model.) 4 Sheets—Sheet 2.

Witnesses.
Inventors.
Frederic W. Hild and
Samuel B. Stewart Jr.
by Albert G. Davis
Atty.

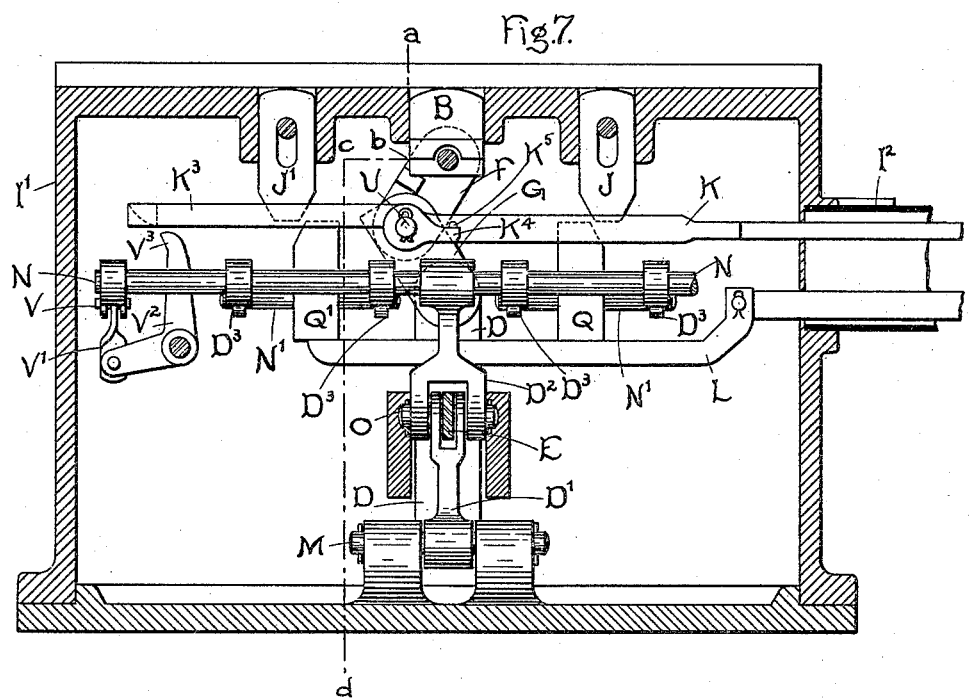
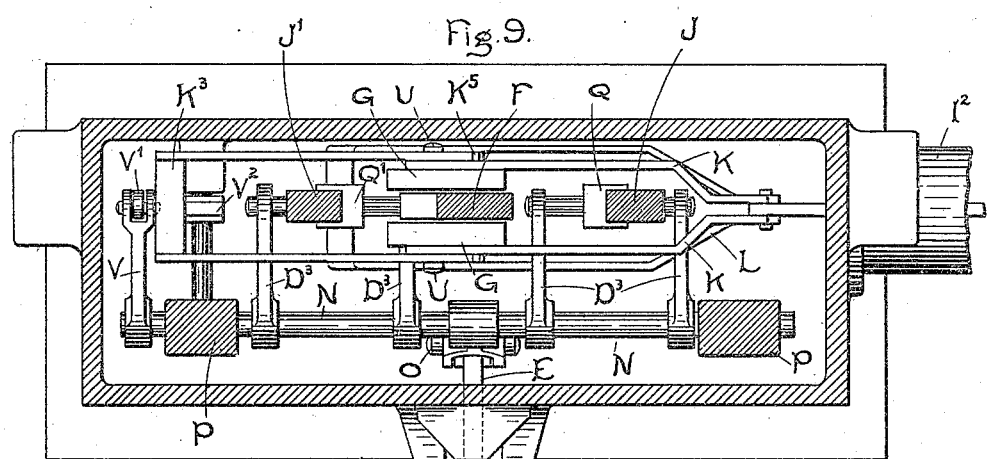

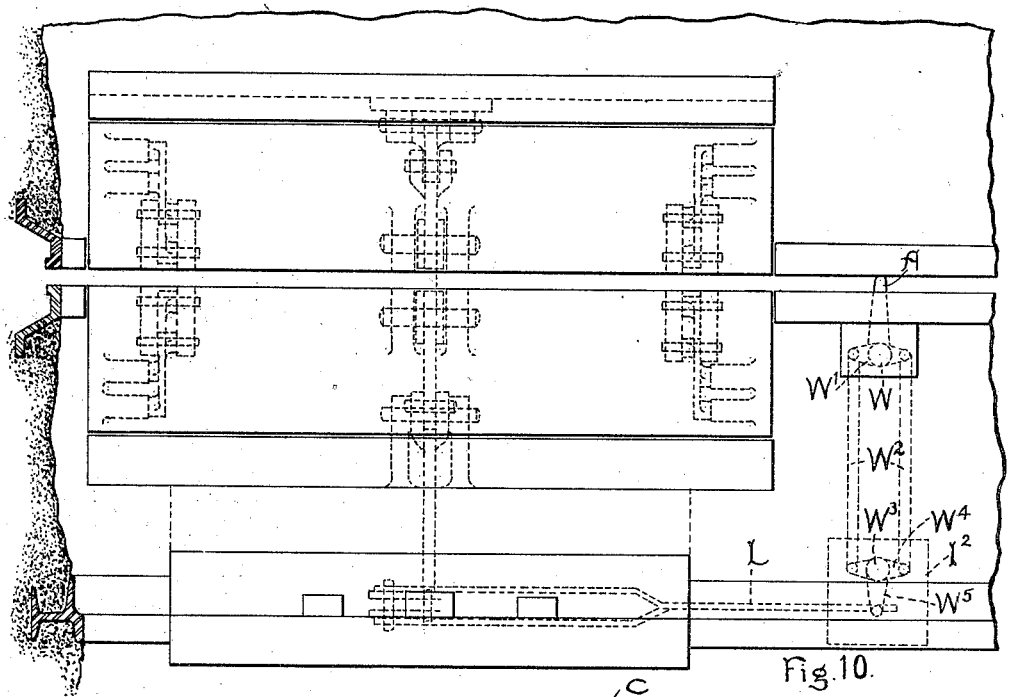

UNITED STATES PATENT OFFICE.

FREDERIC W. HILD AND SAMUEL B. STEWART, JR., OF SCHENECTADY, NEW YORK, ASSIGNORS TO GENERAL ELECTRIC COMPANY, A CORPORATION OF NEW YORK.

ELECTRIC RAILWAY.

SPECIFICATION forming part of Letters Patent No. 705,083, dated July 22, 1902.

Application filed November 30, 1900. Serial No. 38,133. (No model.)

*To all whom it may concern:*

Be it known that we, FREDERIC W. HILD and SAMUEL B. STEWART, Jr., citizens of the United States, residing at Schenectady, county of Schenectady, State of New York, have invented certain new and useful Improvements in Railways, (Case No. 1,263,) of which the following is a specification.

This invention relates to improvements in electric railways of the type wherein the working conductors are located in a conduit for a portion of the way and in other portions they are located outside the conduit either on the surface or suspended overhead. In this type of railways it is well known that it is necessary when the end of the conduit is reached by the car to move into or out of the conduit the plow which passes through the slot and connects the working conductors with the motors on the car. For this purpose removable covers for the conduit are provided, and when these are removed to open the conduit the plow can be raised or lowered by any suitable means.

The invention consists in means whereby the conduit cover or covers can be opened and closed automatically by the car itself.

Figure 8:
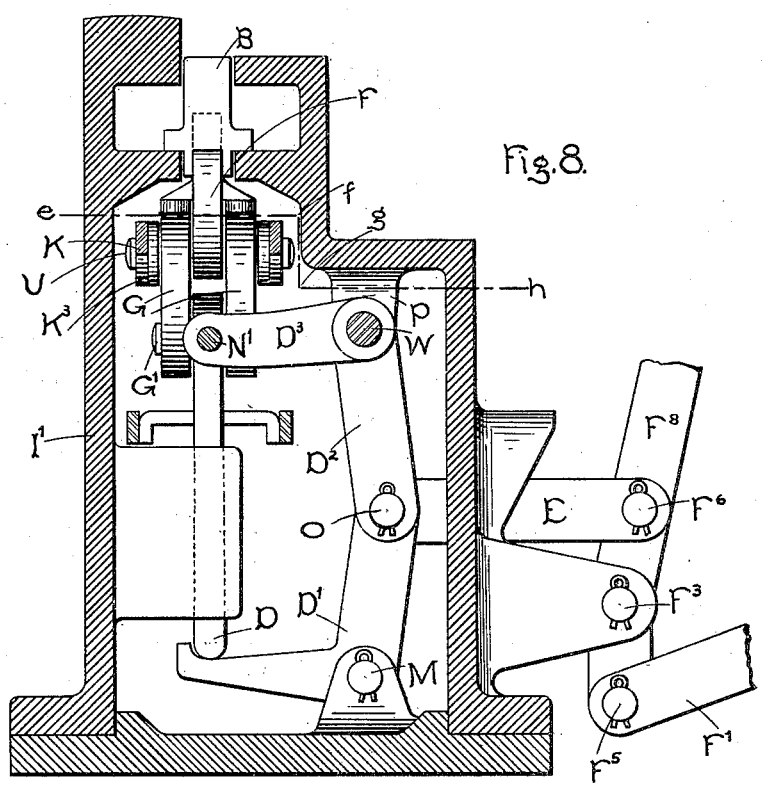
Figure 6:
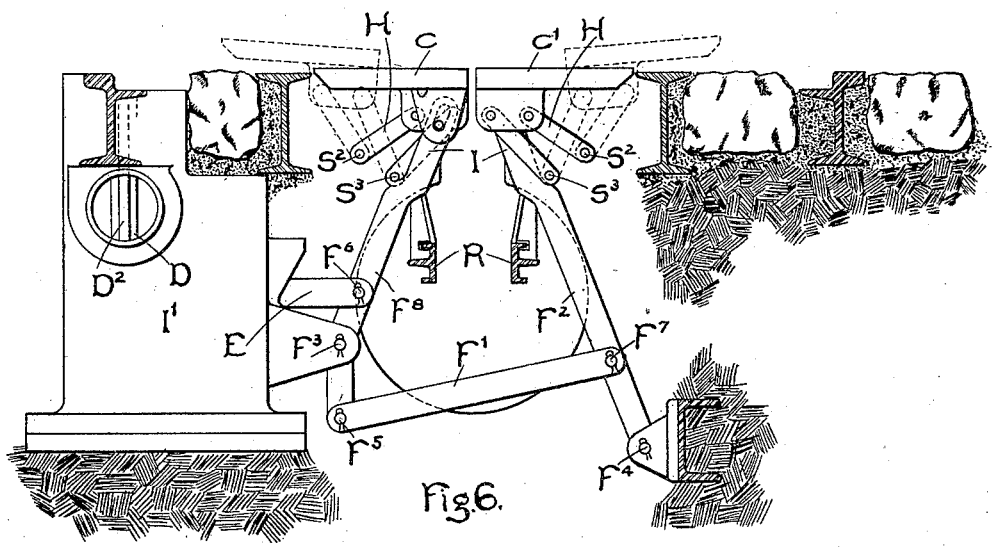

Of the drawings, Figures 1 to 5 are diagrammatic elevations of an electric railway to which the invention has been applied. Fig. 6 is a transverse vertical section of the roadway and conduit, showing the mechanism which is directly connected to the conduit-covers. Fig. 7 is a longitudinal vertical section of a compartment in which is located the mechanism which is directly operated by the car and which in turn operates the mechanism shown in Fig. 6. Fig. 8 is a vertical section of said compartment along the line $a\,b\,c\,d$ of Fig. 7 and showing the connection between the mechanisms shown in Figs. 6 and 7. Fig. 9 is a horizontal section along the line $e\,f\,g\,h$ of Fig. 8 and showing in plan the mechanism in the compartment. Fig. 10 is a plan of the roadway, showing the slot and the operating mechanism in dotted lines. Fig. 11 is an elevation of the interior of the conduit, showing the mechanism directly connected to the conduit-covers; and Fig. 12 is a vertical transverse section of the road-bed and conduit, showing the mechanism whereby the apparatus is set in operative condition through the slot.

The invention may first be comprehended in a general way by reference to Figs. 1 to 5, inclusive, in which it is shown diagrammatically, and the remaining figures serve to illustrate the apparatus designed to carry out the invention in practice.

In Figs. 1, 2, and 4 a car is shown which is provided with a plow Z, as is customary. The plow may be raised and lowered in any suitable manner, as by the motorman, as shown, and as there will be a grounded circuit for the overhead or third-rail portion of the road arrangements should be made in accordance with any of the inventions hitherto made to change the motor connections at the same time that the plow is raised or lowered. In Fig. 1 the plow Z is shown as extending into the conduit and the car is about to reach the end or other desired part of the conduit portion of the road and pass over the conduit-covers C C of Fig. 6, which are located in Fig. 1 immediately in front of the car. The actual operations of opening and closing these covers are accomplished by the engagement of the car-wheels with the buttons B J J', two of which in the movement of the car in one direction are successively depressed to effect said opening and closing. These buttons are normally depressed, however, so as to be inoperative, and, as shown in Fig. 1, the motorman is about to put the mechanism in an operative condition. He has inserted his switch-lever Y into the slot, so that the lever bears upon a portion X on the car as a fulcrum, and as the car proceeds the lever Y strikes the lever A, which is mounted on the fixed pivot $W^3$. If desired, the parts X and Y may be permanently fixed in place on the car. The function of the lever A is to raise the button B in the path of the forward car-wheel, the button B being adapted when depressed by the wheel to actuate the mechanism connected to the conduit-covers to open the latter. When the car is proceeding to the left, as shown in the figures, the lower end or part $W^5$ of the lever A engages with the right-hand bend portion $K'$ of a toggle-rod K to force the latter to the right. As the toggle-rod K is connected to the pivot-piece of the toggle-levers F G, which serve as a support for the button B, this movement of the toggle-rod knuckles the toggles and moves that part connected with the toggles which has the less resistance, which is the button B, which is thus raised in the path of the forward car-wheel. As in many cases the railway comprises but a single track, mechanism is provided so that the toggle-rod K will be moved to knuckle the toggle by a car moving in either direction. If the car shown in Fig. 1 be moving toward the right, the lower portion of the lever A will be forced to the left against the depending portion of the reversing-lever $K^2$, which moves on a fixed pivot $W^6$ and is connected to the toggle-rod K at $W^7$. Thus the movement of the lower portion of the lever A to the left will cause the toggle-rod K to be moved to the right, as before, to knuckle the toggle-levers F G and to raise the button B in the path of the car-wheels, which result is illustrated in Figs. 2 and 3, the forward car-wheel being about to depress the button B and the conduit-covers C C being yet closed. When the forward car-wheel in the forward movement of the car depresses the button B, the plunger D will be also depressed to move the bell-crank lever D', which moves the lever E to the left and actuates the mechanism connected to the conduit-covers, as shown in detail in Fig. 6, to open the covers. The first step is now complete, Fig. 5; but there must also be provided means whereby the covers can be closed after the plow has been withdrawn and whereby the toggle can be unknuckled, so that it can be in position to be knuckled and raised upon the approach of another car. To these ends the lever A has another function, which has already been carried out simultaneously with its above-described function. Its lower end is attached to a "dog-rod" L, so called because it carries two dogs Q and Q', which are adapted to engage with the closing-buttons J and J', but are both normally in neutral positions with respect to said buttons. These closing-buttons are independently mounted, as by a pin and slot, as shown, and are located one in rear and one in front of the opening-button B on the line of the track. One of these closing-buttons is raised when the opening-button B is depressed by the forward car-wheel in order that it in turn may be depressed by the rear car-wheel to operate the mechanism in the conduit to close the conduit-covers after the plow has been raised from the conduit. The selection of the closing-button which is to be raised is determined by the dogs Q and Q' on the dog-rod L, and the operation of this dog-rod is in turn dependent upon the direction of movement of the car.

As shown in Fig. 2, the lower portion of the lever A has been moved to the right, carrying the dog-rod L with it and bringing the dog Q directly beneath the closing-button J. Now when the button B has been depressed, as described, by the forward wheel of the car to move the covers C C to the position shown in Fig. 5 the bell-crank lever D' will not only force the lever E to the left, but will raise the upper arm of the bell-crank lever $D^2$ $D^3$ to raise the dogs Q Q', and thereby raise the button J, which is in engagement with the dog Q. The button J is now, therefore, as shown in Fig. 4, in a position to be depressed by the rear car-wheel to close the conduit-covers; but a further operation has taken place as a result of the depression of the button B—namely, the engagement of the latch $V^3$ with the unknuckling-rod $K^3$. This result is accomplished by mechanism to be hereinafter described; but the steps can readily be understood in Figs. 1, 2, and 4. In Fig. 2 there is no change from the position of the bell-crank lever $V^2$, which is formed with a latch $V^3$ at one end; but the unknuckling-rod $K^3$, the end of which is attached to the knuckle-joint, has been raised by the knuckling of the toggle-levers F G. In Fig. 4 the rod $K^3$ has been depressed along with the toggle and button B and the bell-crank lever $V^2$ has been revolved clockwise, the result being that the latch $V^3$ engages with the rod $K^3$. Now when the rear car-wheel engages with the button J (shown raised in Fig. 4) the dog Q, carried by rod L, will be depressed to force down the levers $D^3$ $D^2$ and, Fig. 5, force the lever E to the right to close the conduit-covers C C. Also the bell-crank lever $V^2$ will be moved, Fig. 7, in a direction opposite to the hands of a clock to draw the rod $K^3$ to the left, thereby unknuckling the toggle-levers F G, moving the toggle-rod K to the left, and thereby moving the lever A on its pivot W, so that it is again in position in the slot to be operated by the motorman or in any suitable manner to put the apparatus in an operative condition. The dog-rod L is also moved by this movement of the lever A so that the dogs Q and Q' are in their neutral positions with respect to the closing-buttons J and J', wherefrom they can be removed, so that the proper dog is in engagement with the rear closing-button, which is dependent upon the direction of movement of the car.

Leaving for an instant the consideration of the general operation, let us consider Fig. 6, in which is shown the cover-operating mechanism in the conduit containing the positive and negative conductor-rails R. At the left is shown the casing I', which contains the mechanism actuated by the buttons along the track-rail, which are not seen, as they are depressed on a level with the rail. The plunger D and lever $D^2$ are, however, shown. The lever E is reciprocated horizontally by the mechanism in the casing I' and operates the mechanism connected to the covers C C as follows: The right-hand end of the lever E is pivoted at $F^6$ to a lever $F^8$, which is pivoted at $F^3$ to a fixed support forming a part of the casing I'. When the lever E by the depression of the opening-button in the roadway is moved to the left, the upper end of the lever $F^8$, which is connected to the cover C by a pin and slot, is moved to the left, causing the cover, which is pivoted to parallel levers $S^2 S^3$, which are in turn pivoted to fixed supports, to move upwardly and outwardly to open the conduit. At the same time the lower end of the lever $F^8$ forces the lever F', which is pivoted to it at $F^5$, to the right, whereby the upper portion of the lever $F^2$, which is connected to the right-hand cover C, is moved to the right to cause that cover to move upwardly and outwardly, so that the conduit is fully opened for the removal or insertion of the plow carried by the car.

In Fig. 8, which is a vertical section of the casing I', the connection of the lever E with the mechanism inside the casing can be readily seen.

Figs. 8 and 9 are sections of Fig. 7, and from the latter figure the operation of the mechanism inside the casing I' can be most readily understood. With respect to this Fig. 7 will be resumed the discussion of the general operation of the apparatus, especially as regards the practical embodiment of the invention.

As hitherto described, the button B is first raised by the knuckling of the toggle F G, which is caused by the movement to the right of the toggle-rod K, which is in turn caused by the engagement of the motorman's lever or a part of the car with the lever A, extending in the conduit across the slot. When the button B is depressed by the forward car-wheel, the plunger D forces down the end of the bell-crank lever D', Figs. 7 and 8, to draw the lever E into the casing I' and open the conduit-covers. This movement also draws the lower end of the arm $D^2$ farther into the casing and rocks the shaft N, to which the upper end of the arm $D^2$ is secured. The shaft N has secured to it a number of arms $D^3$, Figs. 8 and 9, which carry supports N' at their outer ends, and on these supports N' are mounted for horizontal reciprocation the dogs Q Q', which are so mounted in order that the rod L, to which they are secured, can be reciprocated by the lever A, Fig. 1, to move the dogs from their neutral positions to positions under their respective buttons J and J'. From this it will be clear that when the shaft N is rocked the dogs Q will be raised by the supports N', so that the dog which has been moved in alinement with its button upon the knuckling of the toggle-levers will raise that button between the front and rear car-wheels in a position to be depressed by the latter to open the conduit-covers. While this operation caused by the depression of the button B has been taking place the unknuckling-rod $K^3$, which was raised and moved to the right when the toggle-levers were knuckled, has been also depressed, as its right end is attached to the knuckle-joint. At its left end the shaft N has mounted upon it an arm V, from the free end of which is loosely suspended a twisted link V', which in turn is connected at its free end to one end of a bell-crank lever $V^2$, formed at its other end with a latch $V^3$, adapted to engage with the end of the lever $K^3$. At the same time that the rod $K^3$ has been depressed by the button B the bell-crank lever $V^2$ has been rocked clockwise by the rocking of the shaft N, which was caused by the depression of the button B, so that in their positions of rest the latch $V^3$ and the end of the lever $K^2$ are in engagement, as shown in Fig. 4. The rod $K^3$ is preferably constructed independently of the toggle-rod K, but is also mounted on the knuckle-joint, a dog $K^4$ and a pin $K^5$ preventing its downward movement, but permitting it upward play over the latch $V^3$. When the button J, which is the one that has been raised by the operation above described, is depressed by the rear car-wheel, the dog Q is depressed also, carrying with it its support N', and thereby rocking the shaft N, moving the lower end of the arm $D^2$ and the lever E outward to close the conduit-covers. At the same time the rocking of the shaft N causes the rocking of the bell-crank lever $V^2$ in a direction opposite to the direction of movement of the hands of a clock, which in turn by the latch $V^3$ draws the rod $K^3$ to the right, thereby unknuckling the toggle F G and leaving both buttons depressed to a level with the track and ready for the next operation.

In Fig. 10, which is a plan of the roadway, showing the slot and conduit, is shown the lever A, Fig. 1, having suitable connections $W^2$ extending transversely of the road-bed into the casing $I^2$, wherein are located the devices for moving the rod L always in the same direction irrespective of the motion of the car.

In Fig. 11 a cover C is shown in side elevation in its closed position and with its mountings as described above in connection with Fig. 6.

In Fig. 12, which is a transverse vertical section of the road-bed, is shown the lever A, extending across the slot in the conduit. The casing $I^2$, in which the connections from the lever A extend, is shown in section and the devices in the casing in elevation therein. The ends of the rods $W^2$, by which connection is made between the lever A and the apparatus in the casing, are also shown. The left-hand ends of the rods $W^2$ are attached to the arm $W^4$, by which the pivot-piece $W^3$ of the lever $W^5$ is rocked. This pivot-piece or shaft $W^3$ corresponds with the same member $W^3$ in Figs. 1, 2, and 4. K' is the bent end of the toggle-rod K, which is engaged by the lever $W^5$ to move the rod to knuckle the toggle in one direction of movement of the car, and the reversing-lever $K^2$, Fig. 1, a portion of which extends from behind the part K', is mounted on the fixed pivot $W^6$ and is adapted to be engaged by the lever $W^5$ to move the toggle-rod K in the same right-hand direction when the lever $W^5$ is moved in the opposite direction by a car also moving in the opposite direction.

The construction has been more complicated owing to the fact that the parts have been so arranged that only forgings are used; but this was thought best in order to insure an effective and reliable means of carrying out the invention. It is possible that the structure may be somewhat simplified; but it is believed that a very great departure from the structure herein shown may be carried out without going beyond the limits of the invention.

What we claim as new, and desire to secure by Letters Patent of the United States, is—

1. In a railway having a closed conduit containing a conductor arranged to be engaged by a car-collector traveling through a comparatively narrow longitudinal slot, the combination with a cover for an opening into the conduit at a place where it is desired to remove the collector from the conduit, of underground mechanism connected with the cover, and constructed and arranged to be operated by the car to move said cover.

2. In a railway having a closed conduit containing a conductor arranged to be engaged by a car-collector traveling through a comparatively narrow longitudinal slot, the combination with a cover for an opening in the conduit at a place where it is desired to remove the collector from the conduit, of underground mechanism connected with the cover, and constructed and arranged to be operated by the car to move said cover to both open and close said opening.

3. In a railway having a closed conduit containing a conductor arranged to be engaged by a car-collector traveling through a comparatively narrow slot, the combination with a cover for an opening in the conduit at a place where it is desired to remove the collector from the conduit, of underground mechanism connected with the cover and constructed and arranged to be operated by the wheels of a car to move said cover.

4. In a railway having a closed conduit containing a conductor arranged to be engaged by a car-collector traveling through a comparatively narrow slot, the combination with a cover for an opening in the conduit at a place where it is desired to remove the collector from the conduit, of underground mechanism connected with the cover and constructed and arranged to be operated by the wheels of a car to move said cover so as to both open and close said opening.

5. In a railway having a closed conduit containing a conductor arranged to be engaged by a collector traveling through a comparatively narrow slot, the combination with a cover for an opening in the conduit at a place where it is desired to remove the collector from the conduit, of mechanism beneath the surface of the roadway for moving said cover, and buttons arranged to be depressed by the wheels of a car to operate said mechanism.

6. The combination with a conduit-cover, of normally inoperative means which is operated by the car, for moving the cover, and means for rendering said means operative.

7. The combination with a conduit-cover, of normally inoperative means which is operated by the car, for moving the cover, and means controlled from the car for rendering said means operative.

8. The combination with a conduit-cover, of mechanism for operating the cover, a normally depressed button operated by a forward car-wheel to actuate the mechanism to open the cover, and a normally depressed button operated by a rear car-wheel to actuate the mechanism to close the cover.

9. The combination with a conduit-cover, of mechanism for operating the cover, an opening-button which is depressed by a forward car-wheel to actuate the mechanism to open the cover, and a normally depressed button which is raised when the opening-button is depressed and is then depressed by a rear car-wheel to close the cover.

10. The combination with a conduit-cover, of mechanism for operating said cover, a normally depressed opening-button adapted when raised to be depressed by a car, means for raising said button, means whereby when said button is depressed, it actuates said mechanism to open the cover, a normally depressed closing-button, and means whereby the actuation of said mechanism to open the cover, raises the closing-button, and whereby the depression of the latter actuates said mechanism to close the cover.

11. The combination with a conduit-cover, of mechanism for operating said cover, a normally depressed opening-button adapted when raised to be depressed by a car, two normally depressed closing-buttons, one in front and one in rear of the opening-button, each adapted when raised to be depressed by a car, and both being normally incapable of being raised, means controlled by a car moving in either direction, for raising the opening-button, and rendering the rear button with respect to the direction of movement of the car, capable of being raised, means whereby when the opening-button is depressed, it actuates the mechanism to open the cover, means whereby when said mechanism is so actuated, the rear opening-button is raised, and means whereby when the rear opening-button is depressed, it actuates said mechanism to close the cover.

12. The combination with a conduit-cover, of mechanism for operating the cover, a normally depressed opening-button, a toggle-support therefor, a toggle-rod for knuckling the toggle-support and thereby raising the button and means operated by a car moving in either direction to move the toggle-rod always in one direction.

13. The combination with a conduit-cover, of a button for opening the cover, a toggle-support therefor, a toggle-rod for knuckling the toggle and thereby raising the button, a reversing-lever connected to the toggle-rod, and a lever operated by a car moving in one direction to engage the toggle-lever and move it to knuckle the toggle, and operated by a car moving in the other direction to engage the reversing-lever to move the toggle-lever in the same direction as before to knuckle the toggle.

14. The combination with a conduit-cover, of a button which is depressed by a forward car-wheel to open the cover, independently-supported closing-buttons, one before and the other behind said button, means whereby the depression of the opening-button raises the closing-button which is to the rear with respect to the direction of motion of the car, so that it can be depressed by the rear car-wheel to close the cover, and means operated by the car for adapting said rear closing-button to be raised by the depression of the opening-button.

15. The combination with a conduit-cover, of mechanism for operating the cover, a button which is depressed by a forward car-wheel to actuate said mechanism to open the cover, independently-supported closing-buttons, one before and the other behind said button, a dog-rod for the closing-buttons which has connection with said mechanism, whereby the closing-button on the rear of the opening-button with respect to the motion of the car, is raised when the opening-button is depressed, and means operated by the car for preliminarily raising the opening-button and for moving the dog-rod to make said rear closing-button operative by said mechanism.

16. The combination with a conduit-cover, of mechanism for operating the cover, a button which is depressed by a forward car-wheel to actuate said mechanism to open the cover, means operated by the car for raising said button, and a button in the rear of the opening-button and having connection with said mechanism whereby it is raised when the opening-button is depressed, and whereby it actuates the mechanism to close the cover when it is depressed by a rear car-wheel.

17. The combination with a conduit-cover, of mechanism for operating the cover, an opening-button which in being depressed, actuates said mechanism, a toggle-support for said button, means for knuckling the toggle to raise the opening-button, a closing-button which is raised by the depression of the opening-button through said mechanism, and is depressed to close the cover through said mechanism, an unknuckling toggle-rod, and means operated by the closing-button through said mechanism to actuate said unknuckling toggle-rod.

18. The combination with a conduit-cover, of a button, a toggle-support therefor, a plunger controlled by the button, a bell-crank lever operated by the plunger, and mechanism controlled by said lever for opening the cover.

19. The combination with a conduit-cover, of an opening-button, mechanism controlled thereby for operating the cover, a shaft which is rocked by the operation of said mechanism, arms carried by said shaft, a support carried by the arms, a dog reciprocally mounted on the support, and an independently-mounted closing-button which is raised by said dog.

20. The combination with a conduit-cover, an opening-button, a toggle-support therefor which is knuckled to raise the button, mechanism which is operated by the depression of the button to open the cover, a closing-button which is connected to the mechanism so as to be raised thereby, and to operate the mechanism to close the cover when the closing-button is in turn depressed, and a device operated by the mechanism when the latter is actuated by the depression of the closing-button, to unknuckle the toggle.

21. The combination with a conduit-cover, of a button, a toggle-support therefor, means for knuckling the toggle to raise the button, mechanism operated by the depression of the button to open the cover, means for actuating the mechanism to open the cover, a rock-shaft operated by said mechanism, an arm carried by the shaft, a link suspended from the arm and a bell-crank lever actuated by the link to unknuckle the toggle.

22. In a railway of the type described, the combination with a conduit-cover, of a button adapted to be depressed by a car-wheel, mechanism below the roadway for operating the cover, and operating connections between said button and mechanism.

23. In an electric railway of the type described and having an opening at the place desired for the vertical movement of the car-collector, the combination with a cover for the opening, and comprising two parts, of fixed supports, swinging levers pivoted to the cover parts and to said supports, and operating-lever connected to the respective parts of the cover, whereby the latter can be swung back and forth on the swinging levers to open and close the opening in the conduit.

In witness whereof we have hereunto set our hands this 27th day of November, 1900.

FREDERIC W. HILD.
SAMUEL B. STEWART, JR.

Witnesses:
BENJAMIN B. HULL,
MARGARET E. WOOLLEY.